US012341250B1

(12) United States Patent
Young et al.

(10) Patent No.: US 12,341,250 B1
(45) Date of Patent: Jun. 24, 2025

(54) OFFSET-FED REFLECTOR PARALLEL PLATE ANTENNA APPARATUS

(71) Applicant: National Technology & Engineering Solutions of Sandia, LLC, Albuquerque, NM (US)

(72) Inventors: Matthew William Young, Albuquerque, NM (US); Kenneth Vanhille, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 350 days.

(21) Appl. No.: 18/079,130

(22) Filed: Dec. 12, 2022

(51) Int. Cl.
*H01Q 19/13* (2006.01)
*H01Q 1/48* (2006.01)

(52) U.S. Cl.
CPC ............ *H01Q 19/132* (2013.01); *H01Q 1/48* (2013.01)

(58) Field of Classification Search
CPC ................ H01Q 1/48-528; H01Q 19/13-138
See application file for complete search history.

(56) References Cited

U.S. PATENT DOCUMENTS 4,772,890 A 9/1988 Bowen et al.
8,144,067 B2 3/2012 Vogler
9,136,611 B2 9/2015 Mitchell
10,944,164 B2 3/2021 Cooley et al.
2005/0140558 A1* 6/2005 Jung .................... H01Q 19/17 343/781 R
2009/0295656 A1 12/2009 Mansour et al.
2016/0211575 A1* 7/2016 Tang .................. H01Q 21/064

FOREIGN PATENT DOCUMENTS

CN 112952356 A * 6/2021

OTHER PUBLICATIONS

Translation of CN-112952356-A (Year: 2021).*

* cited by examiner

*Primary Examiner* — Renan Luque
(74) *Attorney, Agent, or Firm* — Mark A. Dodd; Merle W. Richman

(57) ABSTRACT

An antenna apparatus described herein includes a first reflector element that comprises a first nonresonant waveguide cavity that is partially bounded by a first parabolic reflector surface. The apparatus optionally includes additional reflector elements arranged in parallel with the first reflector element, where the additional reflector elements include corresponding nonresonant waveguide cavities that are partially bounded by corresponding reflector surfaces. The antenna apparatus is configured to emit an electromagnetic signal based upon electromagnetic signals reflected by the one or more parabolic reflector surfaces and output by the one or more reflector elements. The antenna apparatus may conversely be employed to receive an electromagnetic signal.

18 Claims, 17 Drawing Sheets

OFFSET-FED REFLECTOR PARALLEL PLATE ANTENNA APPARATUS

STATEMENT OF GOVERNMENT INTEREST

This invention was made with Government support under Contract No. DE-NA0003525 awarded by the United States Department of Energy/National Nuclear Security Administration. The Government has certain rights in the invention.

BACKGROUND

Antenna apparatuses are used in a variety of different technical fields, including communications, radar, etc. Within these different technical fields, antenna apparatuses are employed in several different applications. For example, a radar system that includes an antenna apparatus can be coupled to an aerial vehicle (e.g., an airplane, a drone, etc.), a ground vehicle (automobile, bus, freight-carrying truck), spacecraft, or watercraft. The output of the radar system can be employed in connection with determining the location and/or closing velocity of an external object, or even the location of the vehicle with respect to known external features. In another example, an antenna apparatus can be employed in connection with transmitting communications to a receiver and/or receiving communications from a transmitter.

Regardless of the technical field or application associated with an antenna apparatus, the antenna apparatus must meet a wide variety of electrical, mechanical, thermal, radiation, and (sometimes) aerodynamic specifications. Example electrical specifications include specifications for gain, beamwidth, and sidelobe level performance, where each of these specifications are to be met while meeting other constraints, which can relate to the use of specific materials (to survive extreme thermal and time-varying environmental conditions), size and weight requirements for the antenna apparatus, and so forth. With respect to antenna apparatuses of systems that are operated in harsh environments, existing antenna apparatuses can meet the electrical specifications but fail to meet requirements associated with materials, form factor, and resiliency that are necessary for the antenna apparatus to operate effectively and consistently in the harsh environments.

SUMMARY

The following is a brief summary of subject matter that is described in greater detail herein. This summary is not intended to be limiting as to the scope of the claims.

Described herein are technologies related to an antenna apparatus. The antenna apparatus includes an array of reflector elements, where reflector elements in the array include curved (parabolic) reflector surfaces that are delimited by planar surfaces. The reflector elements in the array can optionally be arranged radially or in parallel with one another and have a same or similar size and shape.

With more particularity, a reflector element in the array is formed from a pair of metallic parallel (planar) plates and a curved reflector surface positioned at a periphery of the parallel plates and between the parallel plates. This arrangement forms a nonresonant waveguide cavity, where the nonresonant waveguide cavity is partially bounded by the curved reflector surface and is further bounded by the parallel metallic planar plates arranged on either side of the reflector surface along a width of the reflector surface. The width of the reflector surface is relatively small, such that the reflector element appears planar. The waveguide cavity is nonresonant, serving to guide the electromagnetic wave and provide space for wavefront collimation to occur. The reflector element further includes an aperture that opposes the reflector surface in the reflector element, where electromagnetic signals exit the reflector element by way of the aperture. The nonresonant waveguide cavity is partially populated with a dielectric window at the aperture, where the dielectric window is included in the reflector element to enhance robustness of the antenna element in hazardous environmental conditions. The nonresonant waveguide cavity can also be partially populated with air or vacuum (which are approximately lossless with respect to electromagnetic signals traveling through the nonresonant waveguide cavity). The aperture can be curved or straight, with a design depending upon an application of the antenna apparatus.

In an example, the reflector element is an offset reflector element. The reflector element includes a waveguide feed, where the waveguide feed is positioned such that an electromagnetic signal enters the nonresonant waveguide cavity in parallel with the planar surfaces that delimit the reflector surface. Positioning of the waveguide feed in the plane of the reflector element (such that the feed is in plane with the predominant extent of the reflector element) rather than out of the plane of the reflector element allows for the reflector elements in the array to be positioned very close to one another (thereby suppressing grating lobes of the antenna radiation pattern associated with the antenna array).

The antenna array is conformal and includes several reflector elements (that are identical or similar in size and shape) arranged in parallel with one another. For example, the antenna apparatus can include two reflector elements, four reflector elements, eight reflector elements, 16 reflector elements, or 32 reflector elements. Additionally, an antenna waveguide feed architecture described herein supports non-equal energy splits that enable amplitude tapering (such as for sidelobe control) or non-binary reflector element counts. The antenna apparatus described herein exhibits various advantages over conventional antenna apparatuses, including improved pattern gain and radiation efficiency relative to conventional antenna apparatuses, a lower geometric cross-section compared to conventional antenna apparatuses, and better dispersion characteristics relative to conventional antenna apparatuses, amongst others.

The antenna apparatus also optionally includes a feed network that supports the conformal antenna array referenced above. In an example, the feed network is a splitter network capable of half wavelength spacing between waveguide split ports for antenna arrays. The feed network described herein can include both “T” and “Y” splitters, where waveguide segments between splitters may span distances required by the split port pitch as the splitter network gets larger and not have an impedance matching function. Alternatively, overall impedance bandwidth of the waveguide splitter can be increased by employing known impedance matching techniques between splitters. The last splitter in the feed network is a “Y” splitter where the branch paths of the splitter are parallel to each other so that the feed network can be compact compared to “T” networks where the waveguides emanate from a common point in opposite directions.

Although the antenna apparatus may be fed using a fixed feed network, as described herein, it is also possible to couple one or more antenna elements with separate transmit modules which enable independent control of signals across the antenna apparatus. These transmit modules may be replaced by receive modules or transmit/receive modules.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
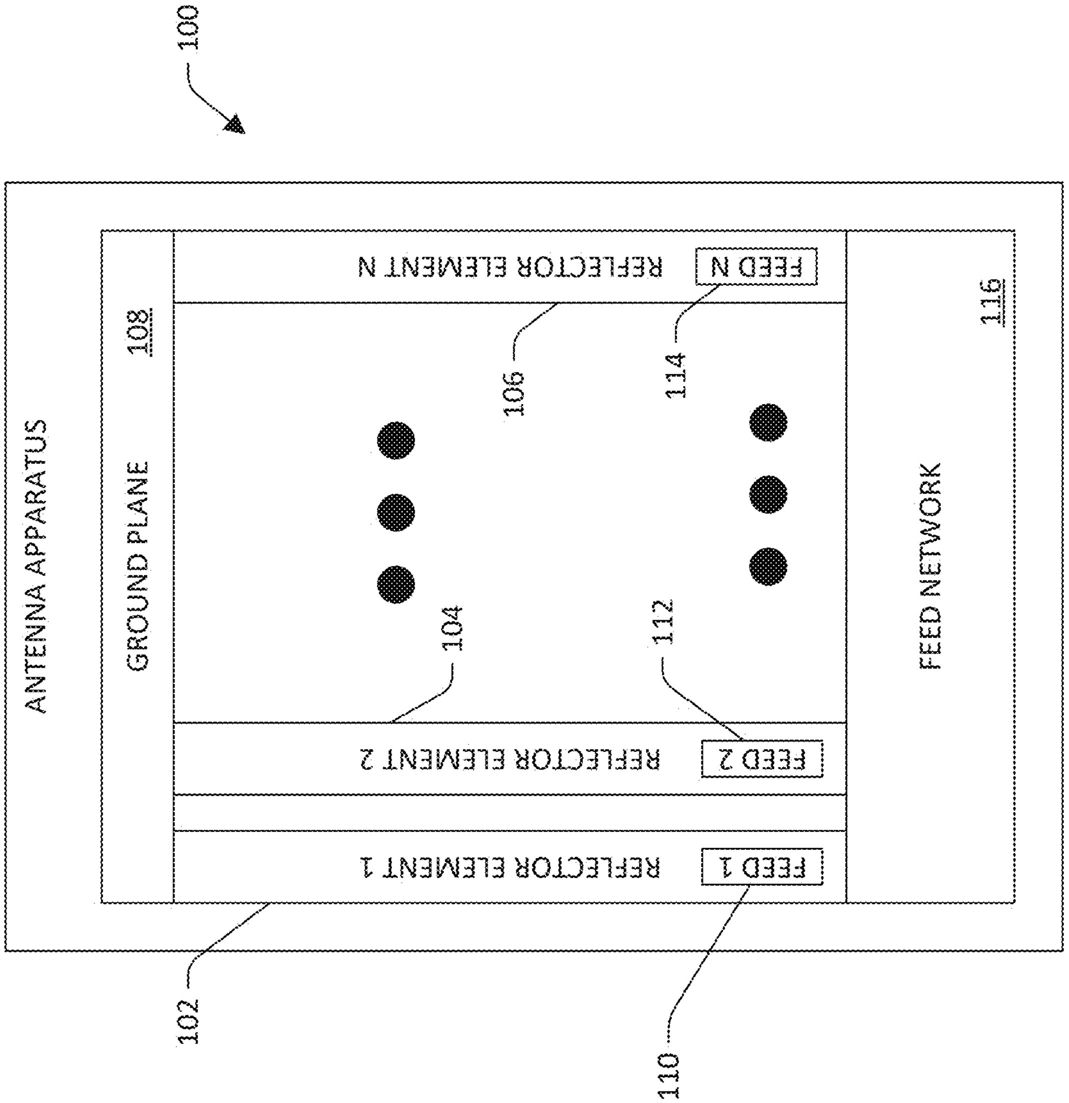
FIG. 1 is a functional block diagram of an antenna apparatus.

Various technologies pertaining to an antenna apparatus that is well-suited for use in harsh environments (as part of a radar system, a communications system, or the like) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Note that the antenna element, antenna array, and feed networks described herein are reciprocal devices. Although an antenna may be described as having a signal incident upon the feed structure and radiated from the antenna or antenna array, it is also possible to have an electromagnetic field incident upon the antenna or antenna array and the received signal be propagated to the feed structure.

Various technologies pertaining to an antenna apparatus are described herein. The antenna apparatus includes an array of reflector elements, where each reflector element has a curved (parabolic) reflector surface. The curved reflector surface has a width that is delimited by planar surfaces that extend orthogonally from the reflector surface on both sides of the reflector surface and along a length of the reflector surface. The width of the reflector surface is relatively small, such that the reflector element appears to be planar. The array of reflector elements includes several reflector elements arranged in parallel, where the array of reflector elements is conformal. The antenna apparatus also optionally includes a feed network that simultaneously directs electromagnetic signals into waveguide cavities of the reflector elements in the array of reflector elements. The architectures of the antenna array and the feed network allow for the antenna apparatus to meet electrical specifications (such as gain, beamwidth, and sidelobe level performance specifications) while also meeting specifications associated with an environment in which the antenna apparatus is to be deployed (specifications as to materials, size, weight requirements, etc.).

With reference now to FIG. 1, a functional block diagram of an antenna apparatus 100 is illustrated. The antenna apparatus 100 includes several reflector elements 102-106. As will be described in greater detail below, each of the reflector elements 102-106 have a pair of parallel planar metallic surfaces with boundaries therebetween defined by three elements: 1) a curved reflector surface; 2) an aperture; and 3) a support surface. Thus, the parallel planar metallic surfaces are placed on either side of the curved reflector surface, the aperture, and the support surface, where the planar metallic surfaces are in parallel with one another, thereby forming the parallel-plate nonresonant waveguide. Positioning of the parallel planar metallic surfaces on either side of the three boundaries mentioned above results in formation of a nonresonant waveguide cavity, where the reflector surface is concave within the nonresonant waveguide cavity. The nonresonant waveguide cavity, along with the reflector surface, act to collimate and guide the electromagnetic energy toward the aperture of the antenna apparatus 100. The widths of the reflector surface and the support surface, i.e., the spacing between the parallel metallic planar surfaces, are relatively small (e.g., between 0.05 and 0.6 freespace wavelengths), such that the reflector elements 102-106 appear to be planar. The reflector elements 102-106 can be placed proximate to one another within the antenna apparatus 100 and in parallel with one another (and "stacked" with respect to one another) to create an array of conformal elements.

The antenna apparatus 100 additionally includes a ground plane 108 that is coupled to the reflector elements 102-106 near the aperture surfaces of the reflector elements 102-106. While not illustrated in FIG. 1, the waveguide cavities of the reflector elements 102-106 can be at least partially populated with respective dielectric windows, where the dielectric windows are positioned along the apertures of the reflector elements 102-106. In addition, the waveguide cavities can be partially populated with air or vacuum (e.g., internal to the parallel metallic planar surfaces). The ground plane 108 can be formed of any suitable conductive material.

The reflector elements 102-106 include feeds 110-114. The feeds 110-114 are positioned on the support surfaces and relative to the reflector surfaces of the reflector elements 102-106 such that the reflector elements 102-106 are offset reflectors. Electromagnetic signals are directed into the waveguide cavities of the reflector elements 102-106 and towards the reflector surfaces of the reflector elements by way of the feeds 110-114, respectively. The feeds 110-114 are positioned on the structural surfaces of the reflector elements 102-106, respectively, such that electromagnetic signals are injected into the waveguide cavities of the reflector elements 102-106 in parallel with the planar surfaces, which are orthogonal to the reflector surfaces and the support surfaces. The placement of the feeds 110-114 on the support surfaces (rather than on the planar surfaces) allows for the reflector elements 102-106 to be positioned close to one another and in parallel with one another, as space is not needed between adjacent reflector elements in the array to accommodate feeds that would otherwise be positioned between reflector elements.

The antenna apparatus 100 additionally optionally includes a feed network 116 that is coupled to the reflector elements 102-106 by way of the feeds 110-114. The feed network 116 can be a splitter that receives an electromagnetic signal and splits the electromagnetic signal amongst the feeds 110-114. The feed network 116 is relatively compact, as the reflector elements 102-106 are placed in parallel with one another and in close proximity to one another. Furthermore, in an example, the feed network 116 can be a one-dimensional feed network.

In operation, an electromagnetic signal is provided to the feed network 116, which splits the electromagnetic signal and directs resultant electromagnetic signals to the feeds 110-114 of the reflector elements 102-106. The reflective surfaces of the reflector elements 102-106 reflect the electromagnetic signals through the apertures of the reflective elements 102-106, and the antenna apparatus 100 emits an electromagnetic signal based upon the reflected signals.

There are various advantages associated with the antenna apparatus 100 over conventional antenna apparatuses. The planar topology of the reflector elements 102-106 and the feeds 110-114 allow for the reflector elements 102-106 to be arrayed with relatively close spacing (less than half of a wavelength of radiation emitted by the reflector elements) for grating lobe suppression over a scan. Furthermore, placement of the feeds 110-114 on the support surfaces of the reflector elements 102-106 (rather than upon the planar surfaces of the reflector elements 102-106) allows for ready integration with the feed network 116, which, as noted above, may be one-dimensional. More specifically, arrayed aperture illumination is obtained with a one-dimensional feed, given the aspect ratio of the apertures, thereby reducing complexity of the feed network 116. In addition, the offset reflector feed configuration in the parallel plate waveguide topology eliminates feed blockage, thereby enabling larger bandwidths and lower sidelobe levels when compared to non-offset feed approaches. Moreover, the reflector surface can be parabolic or have another curved shape to control antenna pattern sidelobe performance. Other advantages will be discussed below.

Figure 2:
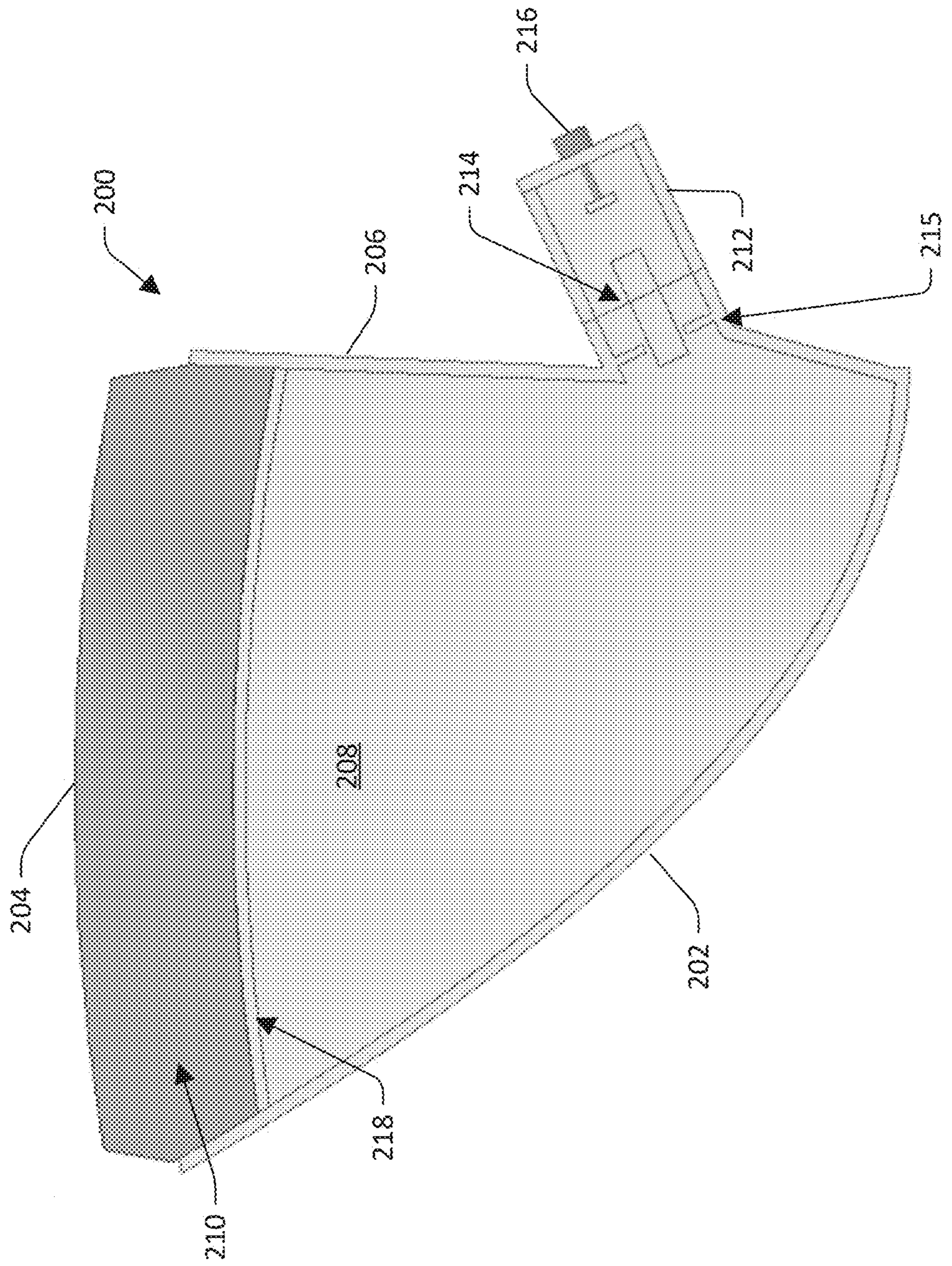
FIG. 2 is a side view of a reflector element of an antenna array apparatus.

Referring now to FIG. 2, a side view of an example implementation of a reflector element 200 is illustrated. The reflector element 200 includes a curved reflector surface 202, an aperture 204, and a support surface 206. The reflector element 200 further includes a metallic planar surface 208 (a bottom planar surface) that is orthogonal to the reflector surface 202 and the support surface 206. While not illustrated, another metallic planar surface is parallel to the metallic planar surface 208, and the two parallel metallic planar surfaces, the reflector surface 202, and the support surface 206 form a nonresonant waveguide cavity.

A dielectric window 210 partially populates the nonresonant waveguide cavity and defines the boundary of the aperture 204 of the reflector element 200. The nonresonant waveguide cavity can also be partially populated with air, vacuum, or an alternative material with a low dielectric constant (e.g., aerogel). The reflector element 200 further includes a feed 212 that extends from the support surface 206, where the feed 212 can be a single ridge waveguide feed incorporating a single ridge 214. Compared to a standard rectangular waveguide, the ridge waveguide has a lower cutoff frequency allowing the geometric cross-section to be reduced. The cutoff frequencies of the higher order modes are also increased, allowing the reflector element 200 to be operated with better dispersion characteristics. An inductive iris 215 is used to impedance match the feed 212 to the nonresonant waveguide cavity.

An end launched coaxial-to-waveguide transition 216 is used to excite the ridge waveguide feed 212. The end launched coaxial-to-waveguide transition 216 is centered in the waveguide and the top of the coaxial probe is shorted to the waveguide wall forming a loop—the loop magnetically couples energy into the fundamental waveguide mode. A section of standard, non-ridged waveguide impedance matches the end launched coaxial-to-waveguide transition 216 to the ridge waveguide feed 212.

To minimize direct aperture illumination, the focal length of the reflector surface 202 is typically between 0.75 and 1.5 guided wavelengths. The dielectric window 210 can be used at the aperture 204 to maintain aerodynamic requirements. The aperture 204 can be curved to conform to a conical or cylindrical platform (as shown in FIG. 2); in other embodiments, however, the aperture 204 can be straight. In an example, the dielectric window 210 is constructed of silicon dioxide ($SiO_2$). In other embodiments, the dielectric window 210 is formed of other technical glasses, ceramics, or otherwise electromagnetically transparent materials.

The depth of the dielectric window 210 along with a capacitive diaphragm 218 across the bottom of the dielectric window 210 forms a single section impedance matching network that minimizes aperture reflections. The aperture impedance is first transformed by the dielectric window 210, which forms a transmission line with a length equal to the depth of the dielectric forming the dielectric window 210. The impedance is then further transformed by the capacitive diaphragm 218 which provides a capacitive admittance. The depth of the dielectric window 210 and the capacitive diaphragm 218 can be tuned to impedance match the aperture. Increased bandwidth can be obtained by moving the capacitive diaphragm 218 closer to the aperture 204. In some embodiments, however, it may be desirable to sacrifice bandwidth to keep the capacitive diaphragm 218 away from the aperture 204, which simplifies manufacturability and improves survivability of the dielectric window 210 in a harsh environment.

Figure 3:
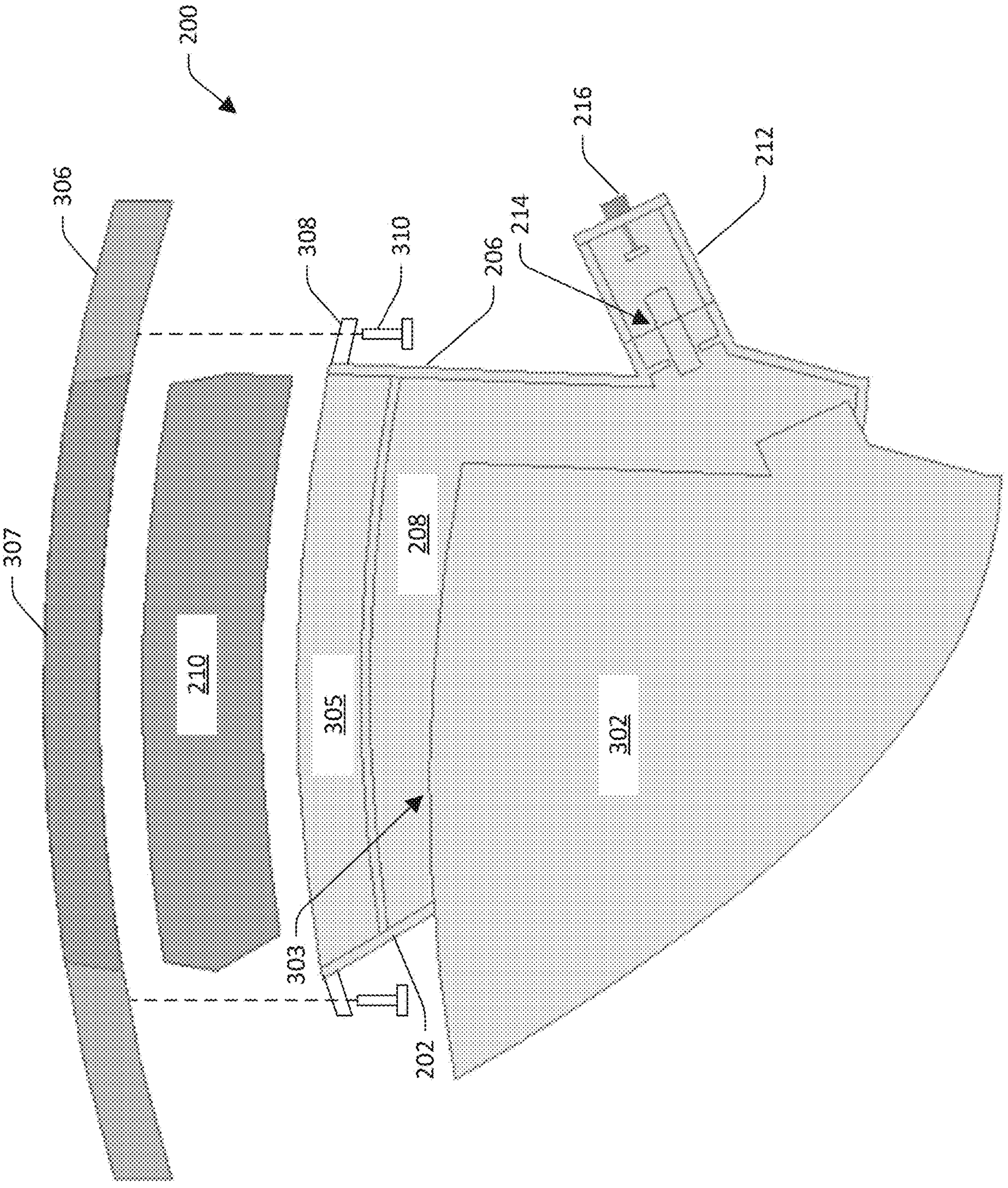
FIG. 3 is an exploded view of the reflector element of the antenna apparatus.

Now turning to FIG. 3, an exploded view of the reflector element 200 is depicted. The reflector element 200 includes the metallic planar surface 208 (the bottom metallic planar surface) and a top metallic planar surface 302. The bottom metallic planar surface 208 and the top metallic surface 302, when coupled together, form top and bottom surfaces of a waveguide cavity 303, where the metallic planar surfaces 208 and 302 are parallel to one another. The dielectric window 210 fits into a recessed region 305 formed when the metallic planar surfaces 208 and 302 are secured to one another. A ground plane 306 is coupled to the metallic planar surfaces 208 and 302, where the ground plane 306 includes a tapered slot 307 through which the dielectric window 210 extends and is retained.

As depicted in FIG. 3, the reflector element 200 is designed to be relatively easily manufactured and built. The reflector element 200 can be constructed in four parts: the conformal ground plane 306, the dielectric window 210, the top metallic planar surface 302, and the bottom metallic planar surface 208. The dielectric window 210 can be tapered to recess into the tapered slot 307 of the ground plane 306 to form a smooth conformal aperture. The dielectric window 210 is also mechanically secured by the recessed region 305 between the two metallic planar surfaces 208 and 302. Pursuant to an example, the metallic planar surfaces 208 and 302 are formed of a suitable metal, such as aluminum. Screws can be employed to secure the metallic planar surfaces 208 and 302 to one another; a radio frequency (RF) gasket can be used between the metallic planar surfaces 208 and 302 to minimize energy leakage. The bottom metallic planar surface 208 can include flanges 308, and screws 310 can be employed to couple the ground plane 306 to the bottom metallic planar surface 208, thereby further securing the dielectric window 210. More permanent attachment methods such as conductive epoxy, soldering, brazing, or welding operations can also be used to connect these different components together. As illustrated in FIG. 3, the bottom metallic planar surface 208 includes the reflector surface 202 and the support surface 206. In other embodiments, the reflector surface 202 and the support surface 206 may be separate pieces that are attached to the metallic planar surfaces 208 and 302.

Figure 4:
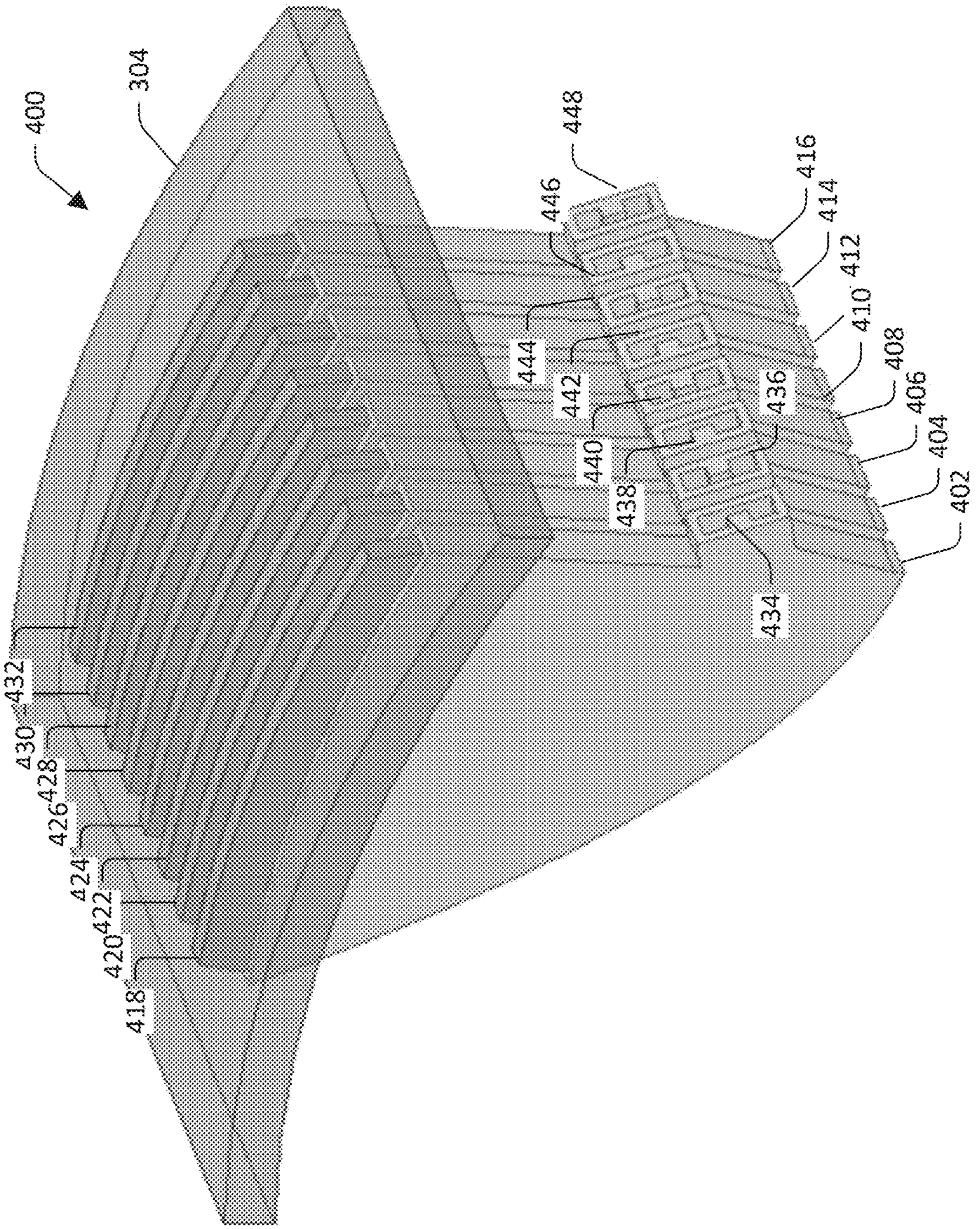
FIG. 4 is an isometric view of an array of planar reflector elements.

Referring now to FIG. 4, an example implementation of an array of reflector elements 400 is depicted. The array of reflector elements 400 includes eight individual reflector elements 402-416. The reflector elements 402-416 have an identical size and shape and are arranged with respect to one another such that an antenna apparatus that includes the array 400, with a curved ground plane 304 and curved set of dielectric windows 418-432, forms a conformal antenna apparatus. While not depicted in FIG. 4, support features could be included in the reflector elements 402-416 to facilitate attaching each reflector element 402-416 to adjacent reflector element(s) 402-416.

Figure 9:
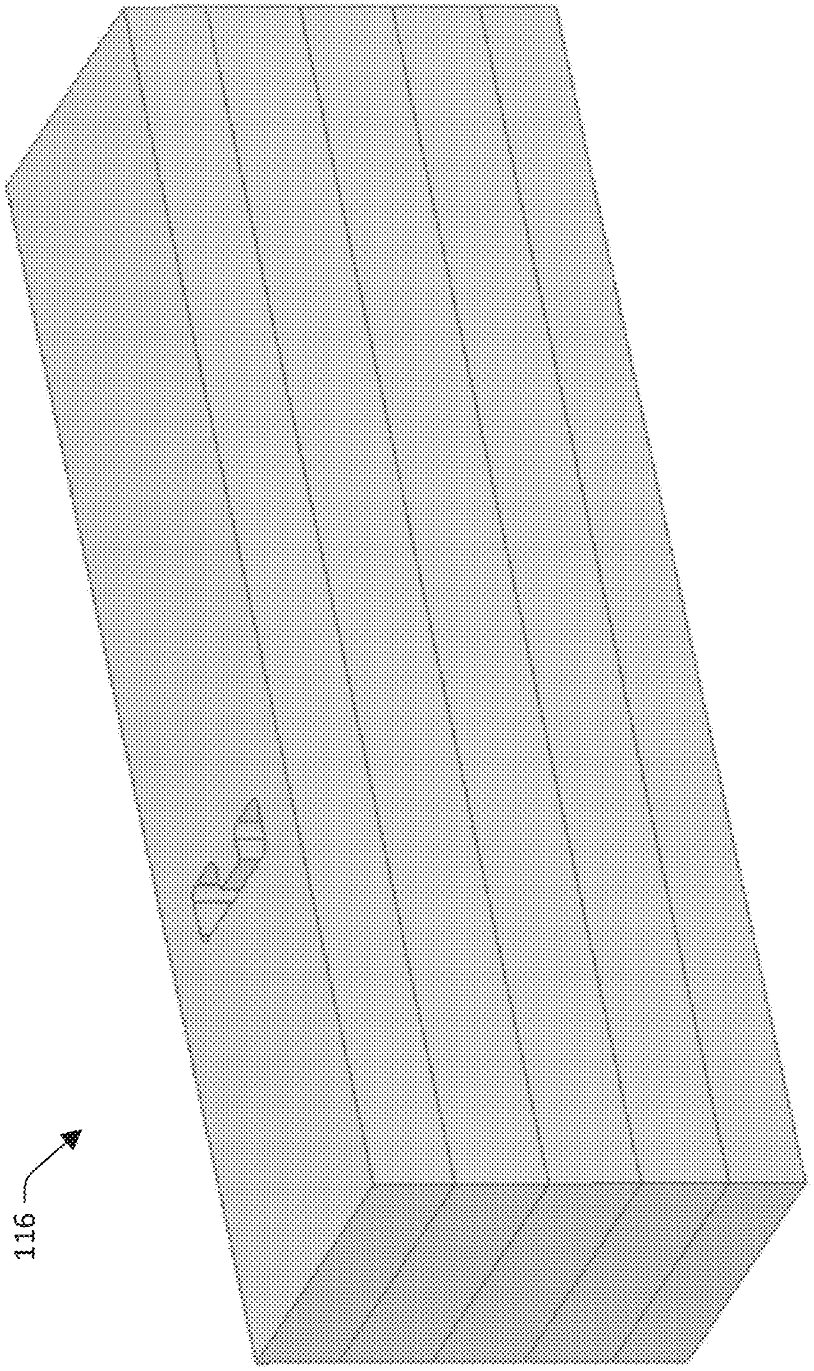
FIG. 9 is an isometric view of a stacked feed network.

The reflector elements 402-416 include respective dielectric windows 418-432 that partially populate the waveguide cavities of the reflector elements 402-416 and extend from the waveguide cavities of the reflector elements 402-416 to define the apertures of the reflector elements 402-416. Note that due to the flexibility of the invention, the radius of curvature of the dielectric windows 418-432, and corresponding apertures, are not constrained. For example, within the array of reflector elements 400, the radius of curvature may be different for each of the dielectric windows 418-432, thereby permitting a conical conformal surface. Further, it can be noted that although the coaxial-to-waveguide transition 216, is shown in FIG. 2, a waveguide feed network, such as what is shown in FIG. 9 could directly attach to ridge waveguide feed structures 434-448, as shown in FIG. 4.

Figure 5:
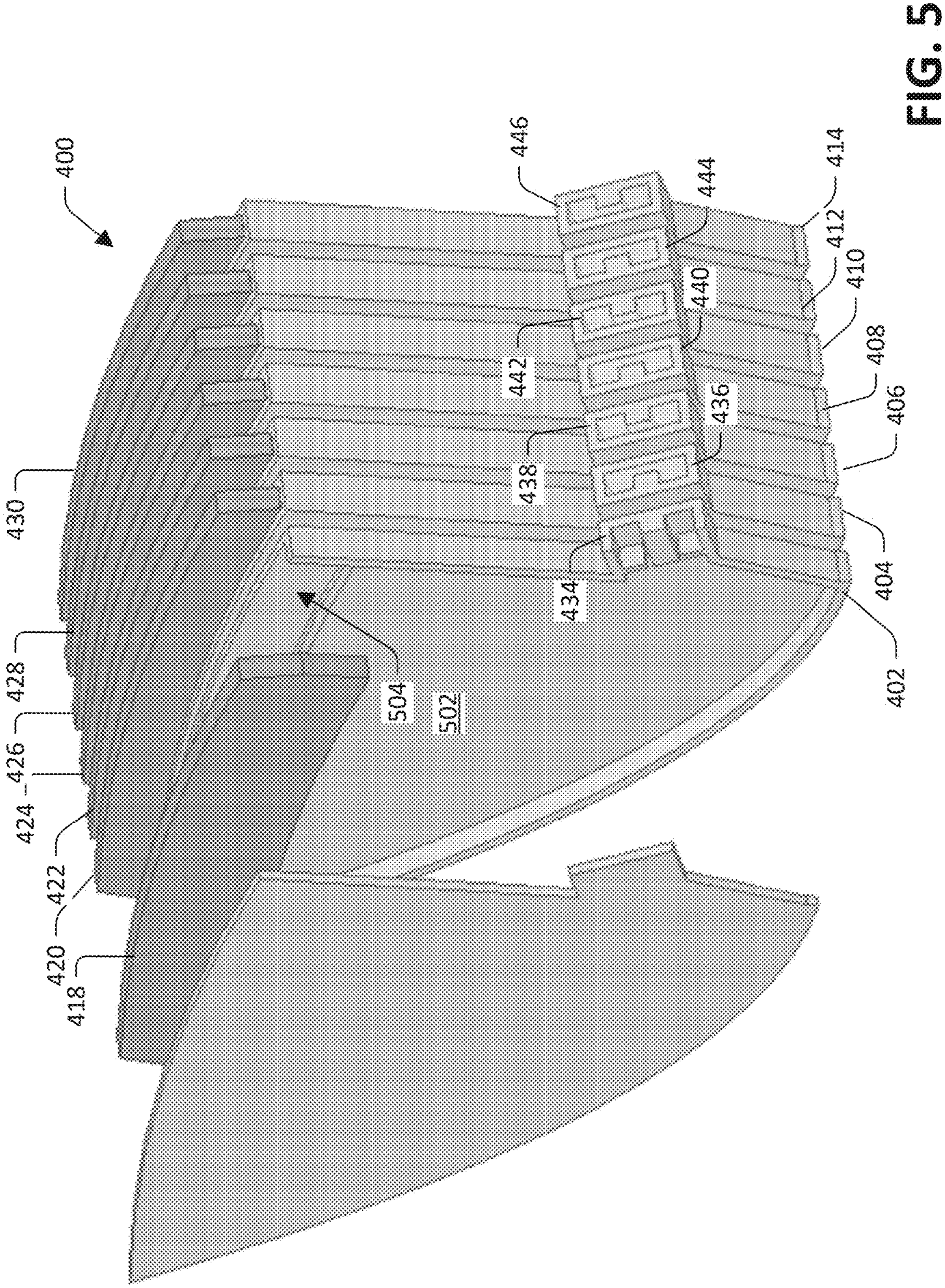
FIG. 5 is another isometric view of the array of planar reflector elements.

FIG. 5 depicts the example array 400, where the reflector element 402 is exploded. A bottom metallic planar surface 502 of the reflector element 402 includes a recessed region 504, where a capacitive ridge impedance matches the aperture impedance discontinuity nearby the outside interface (to enhance bandwidth). While FIGS. 4 and 5 illustrate separately manufactured reflector elements, the bottom metallic planar surface 208 of reflector element 402 may also form the top metallic planar surface 302 of the second reflector element 404, etc., thereby potentially simplifying the manufacturing process.

Figure 6:
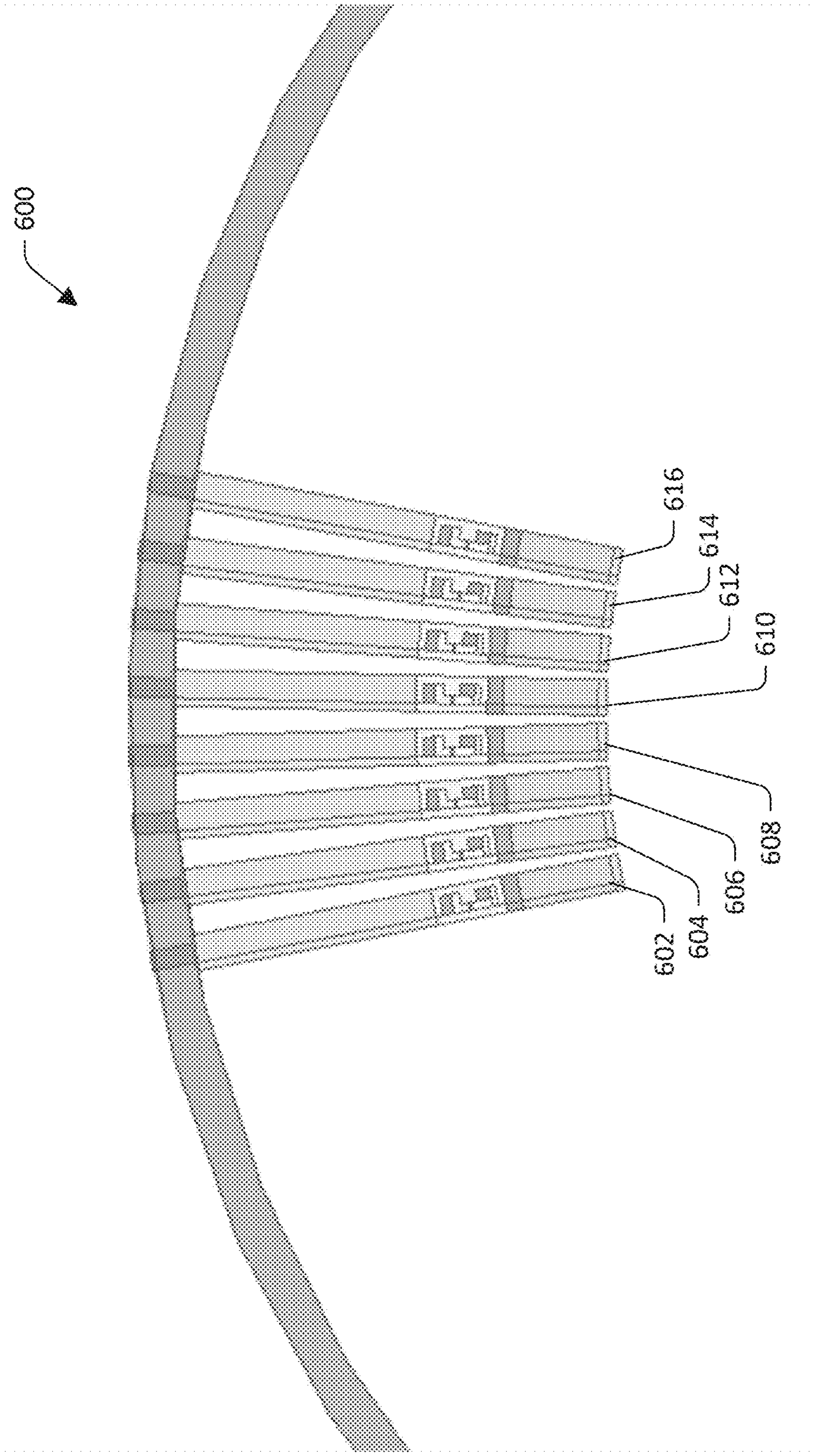
FIG. 6 is a side view of planar reflector elements in an alternative configuration where the reflector elements are radially configured with respect to one another about a common axis.

While FIGS. 4 and 5 illustrate an example antenna array 400 in which the individual reflector elements 402-416 are parallel along a common axis, this is not required. As illustrated in FIG. 6, an example antenna array 600 includes individual reflector elements 602-616 that are radially configured with respect to one another about a common axis. The example antenna array 400 illustrated in FIGS. 4 and 5 may be termed a linear antenna array, while the example antenna array 600 illustrated in FIG. 6 may be termed a radial antenna array.

Note that although subsequent figures describe feed networks for a linear antenna array, it is possible to feed the reflector elements individually, such as with transmit/receive modules that allow electronic scanning from such antenna arrays.

Figure 7:
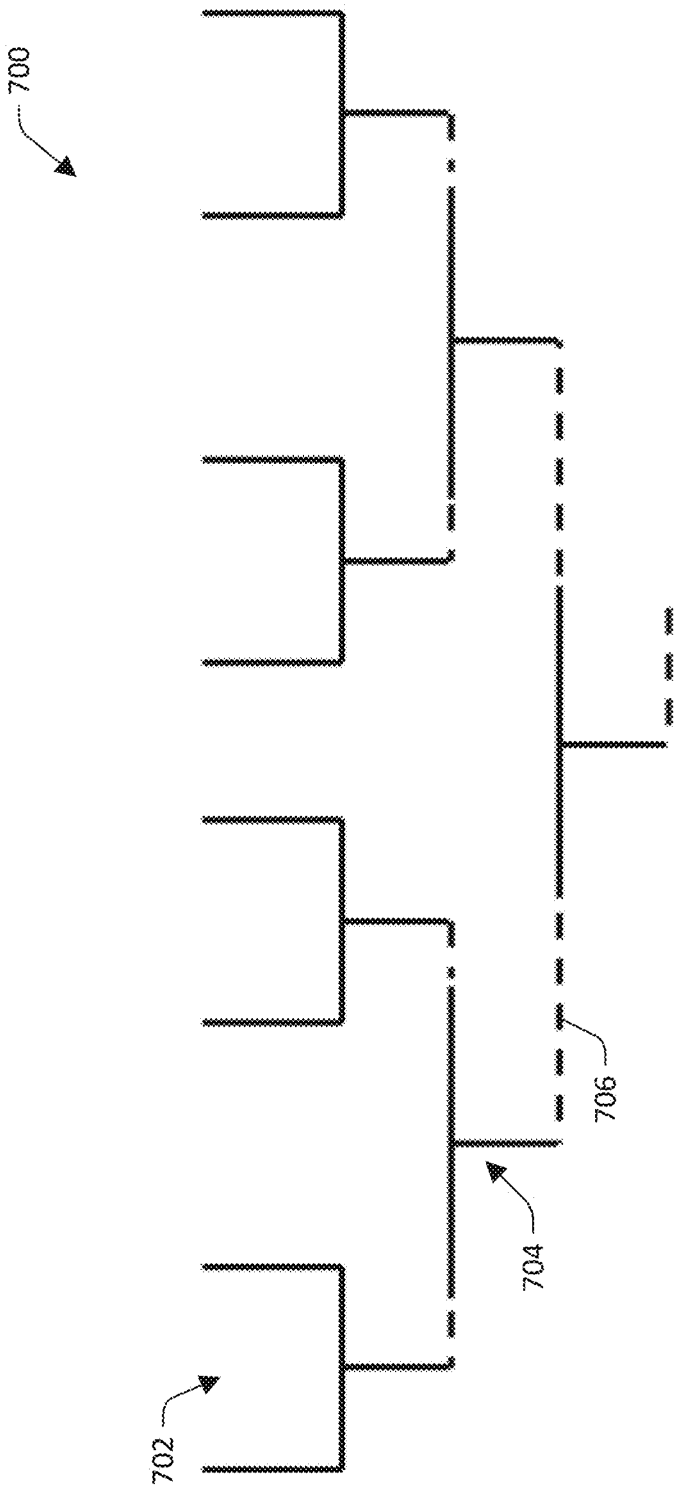
FIG. 7 is a schematic of a feed network.

FIG. 7 is a schematic of the feed network 116 when the feed network 116 is an 8-way splitter. The feed network is a combination of "Y" splitters 702, "T" splitters 704, and connecting waveguides or transmission lines 706. As noted previously, the feed network 116 is capable of half-wavelength spacing between waveguide split ports for arrays of antenna elements. Such spacing is well-suited for providing flexibility for electronic scanning of antenna radiation beams.

Rectangular metal waveguides, such as may be used for the connecting waveguides 706, have two basic dimensions that are normal to the direction of propagation of energy through waveguide. There is a broad wall and a narrow wall. For the fundamental mode of propagation ($TE_{10}$ in a standard waveguide), the electric fields are oriented normal to the broad walls (parallel to the narrow walls). There are standard waveguide sizes, and the narrow wall is commonly half as tall as the broad wall. For a common rectangular waveguide, the length of the broad wall primarily sets the cutoff frequency of the waveguide.

For a single-ridge (or double-ridge) waveguide, the broad wall dimension can be made smaller by the capacitive loading effect of the ridge (or ridges) within the waveguide. As the capacitive gap between the ridge and the opposite wall of the waveguide (or the opposite ridge in the case of dual-ridge waveguide) decreases, the capacitive loading of the waveguide increases and the cutoff frequency decreases. Decreasing this to a very small gap increases the manufacturing sensitivities. By using a single-ridge waveguide, overall cross-sectional area of the inside of the waveguide can be decreased to 25% of its standard area and high manufacturability can be maintained. This decrease in cross-sectional area is equivalent to dielectric loading of a waveguide with a dielectric having a relative permittivity of 4.

With waveguides, there are two basic types of splitter networks—E-plane splitters and H-plane splitters. When the waveguide is operated in its fundamental mode, the "E" and "H" refer to whether the split happens parallel to the direction of the electric field (H-plane splitter) or perpendicular to the direction of the electric field (E-plane splitter). For an H-plane splitter, the electric field vector at the ports is generally oriented in the same direction for all three ports. One of the basic characteristics of an E-plane splitter is that the phase at the two split ports is often 180-degrees out of phase (if the electrical lengths of the split-port paths are equal). For a nominal E-plane splitter, the electric field vector of the common and split ports will not be oriented in the same plane. Alternatively, the energy at the split ports of an H-plane splitter is in phase if the lengths of the split port paths are equal and the energy is split 50% to each branch. The splitters used in the feed network 116 can be E-plane splitters.

For E-plane splitters, there are two splitter network topologies, which are referred to herein as T splitters and Y splitters (704 and 702 in FIG. 7, respectively). A T splitter is a splitter where the two split ports are directed opposite of each other, and the common port enters out of plane of the other two ports. A Y splitter is one where the E-plane of the common port and the two split ports are all in plane, so the split ports are running parallel to each other (instead of in orthogonal directions). As illustrated in FIG. 7, the feed network 116 can be an 8-way splitter network that includes both T and Y splitters. The dashed lines in FIG. 7 show that the connecting waveguide segments 706 between subsequent splitters may simply span the distances required by the split port pitch as the splitter network gets larger, and not have an impedance matching function. Alternatively, the overall impedance bandwidth of the waveguide splitter may be increased by using known impedance matching between splitters.

In the feed network 116, the last splitter is a Y splitter so that the feed network can be compact compared to networks where the waveguides emanate from a common point in opposite directions. The E-plane splitters have opposite phases at each split ports. However, by shaping the T-junction into a Y configuration, the field polarization is rotated in space, such that the field polarization is spatially the same at each antenna port, thereby correcting the out of phase fields from each E-plane split. By feeding the antenna ports in phase, the energy combines constructively in free space.

When non-equal power splits can be supported (and not simply equal splits), a few additional characteristics that can be supported by feed network 116 include the following: 1) non-binary split networks can be supported (e.g., a 12-way splitter); and 2) amplitude tapering can be supported (e.g., unequal power distribution at the split ports supporting a Taylor taper or another amplitude taper supporting sidelobe reduction of an antenna pattern).

Figure 8:
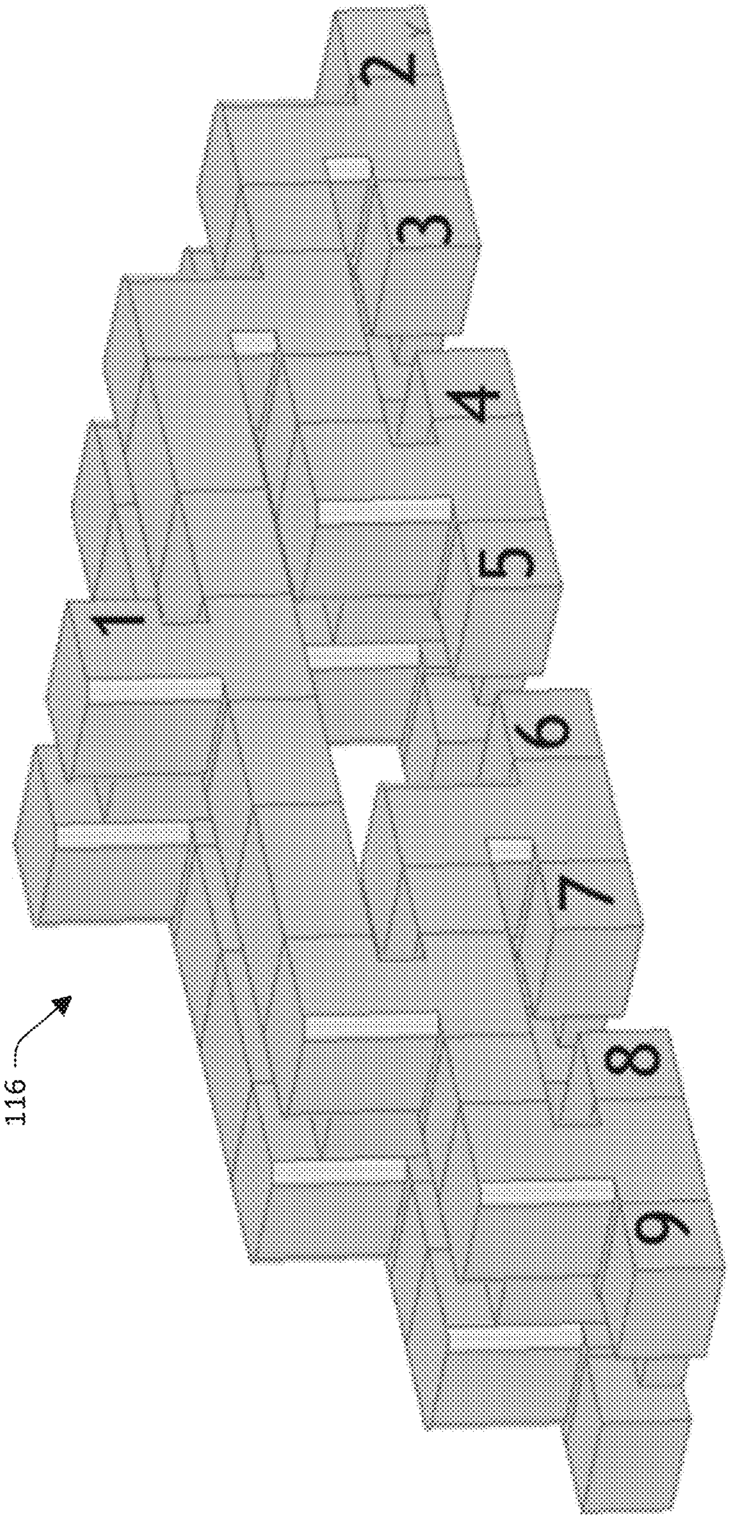
FIG. 8 is a three-dimensional view of the passages of a feed network (metal removed).

FIG. 8 illustrates an example implementation of the feed network 116 that can be employed with the array 400 described above. The feed network 116 is a one-dimensional feed network. In FIG. 8, only the air or vacuum is shown, and not the metal around the splitters. The split ports are on an approximately $\lambda_0/2$ spacing, where $\lambda_0$ is a freespace wavelength. Although not shown, an additional waveguide is included at each of the ports and de-embedded. Port 1 is facing away and to the right, and ports 2-9 are pointed downward in FIG. 8. Note that the apparent "notches" or "grooves" within the feed network 116 illustrated in FIG. 8 are due to the ridges in the ridge waveguides forming the feed network 116.

Figure 10:
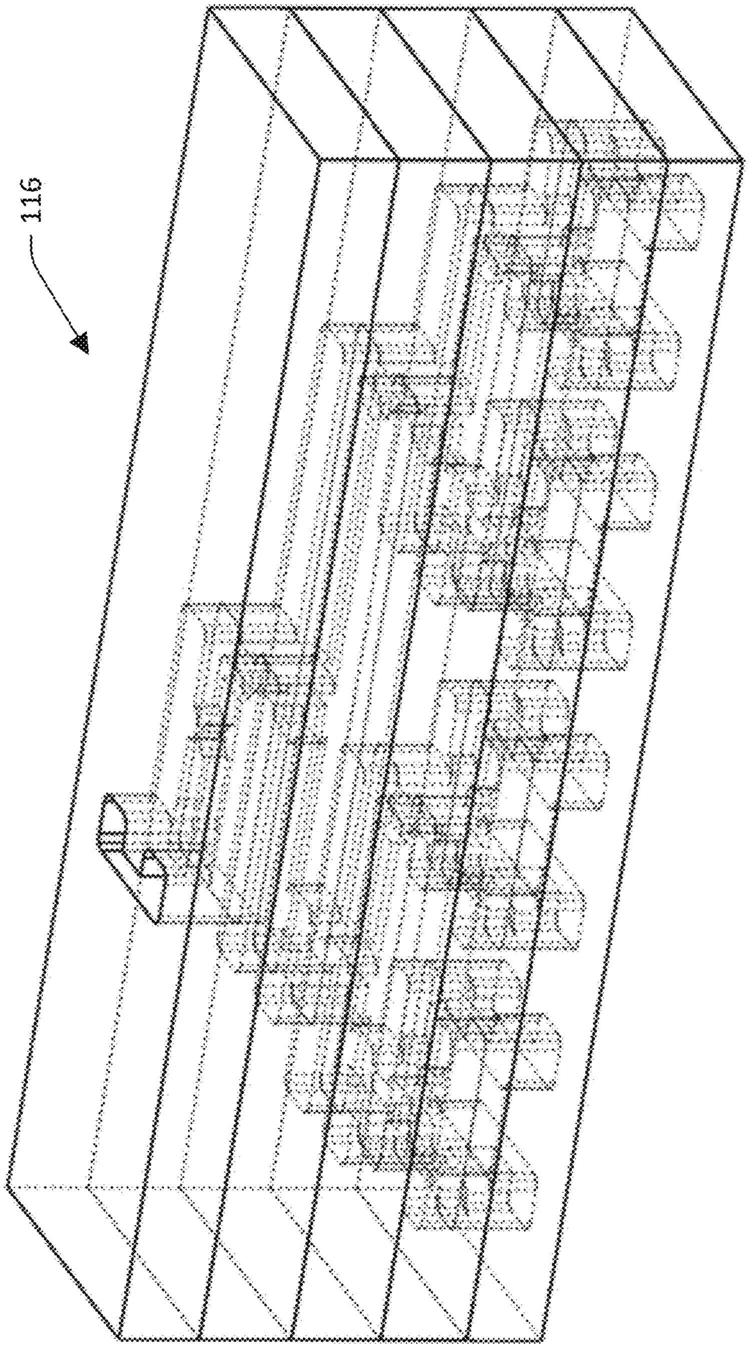
FIG. 10 is a wireframe view of the stacked feed network.
Figure 11:
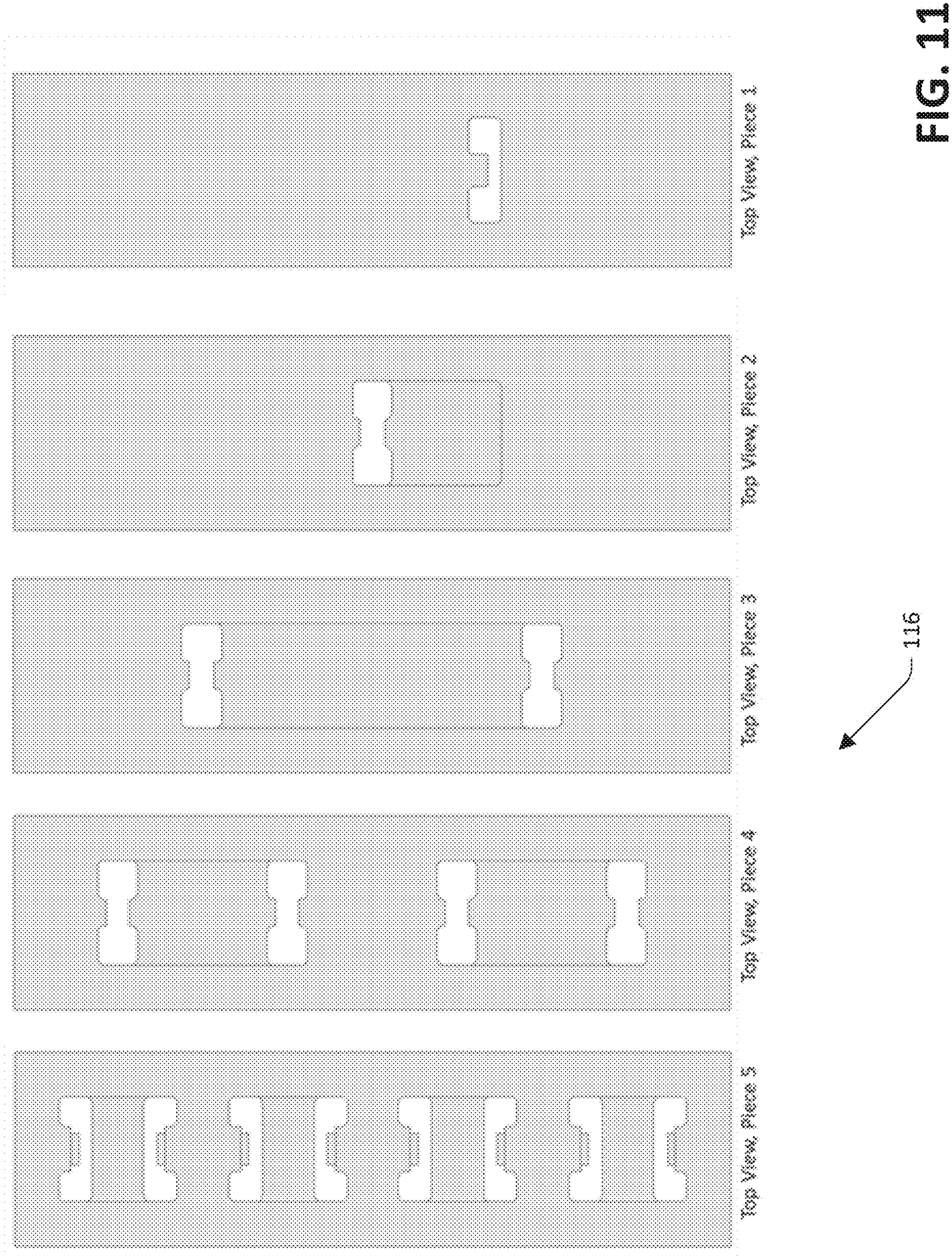
FIG. 11 is a view of the bottom sides of portions of the stacked feed network.
Figure 12:
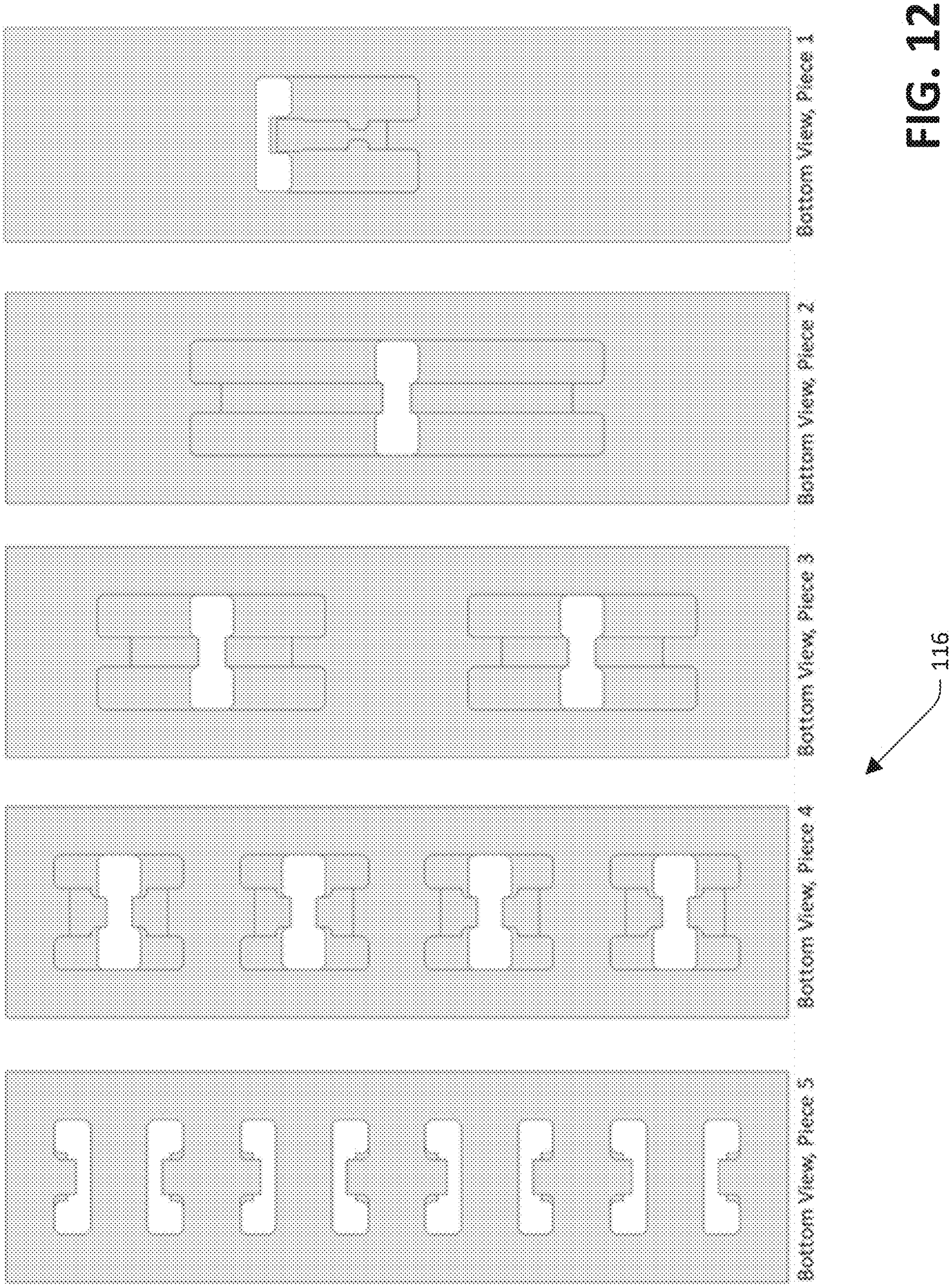
FIG. 12 is a view of tops of portions of the stacked feed network.
Figure 13:
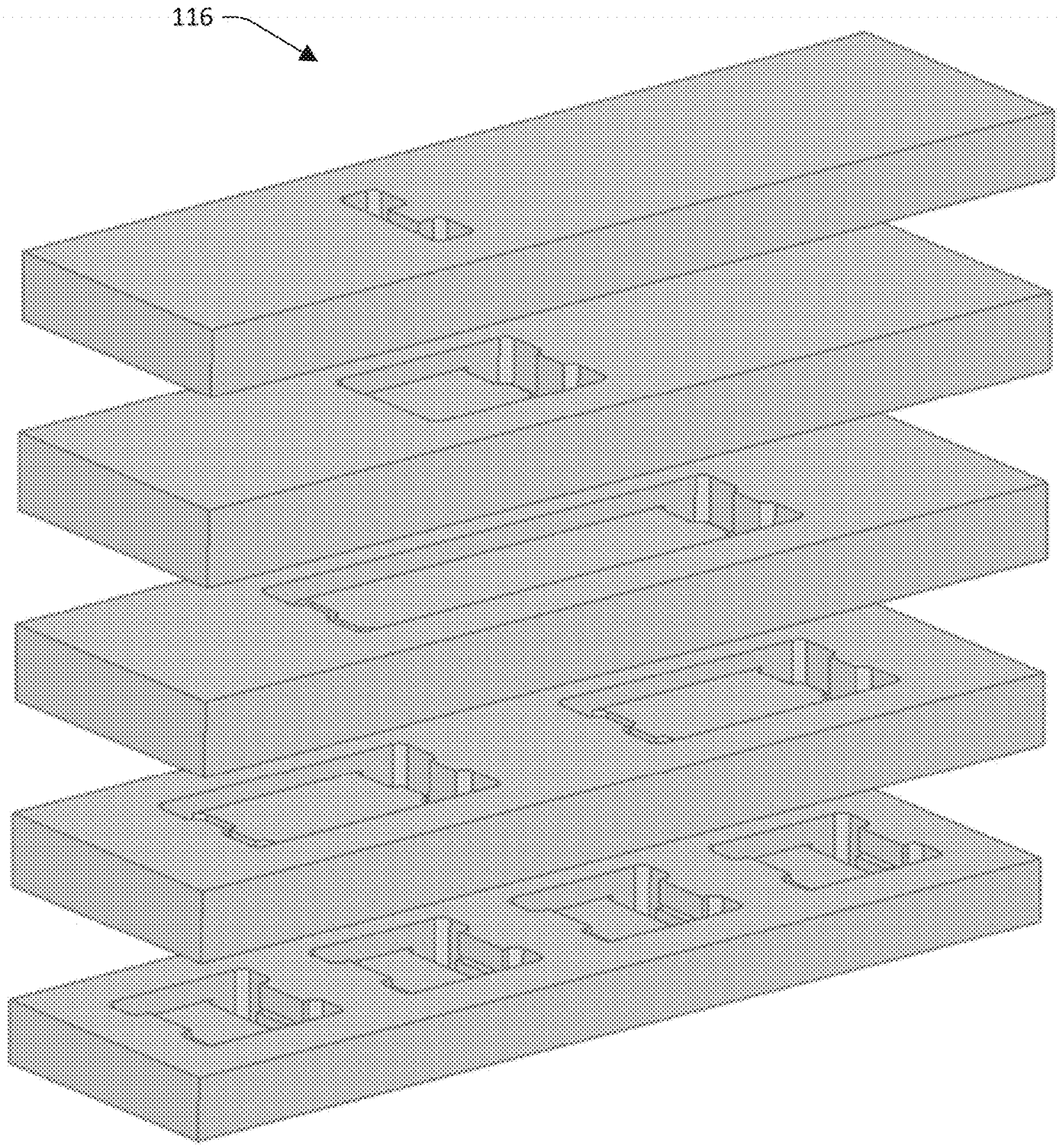
FIGS. 13 and 14 are exploded isometric views of the stacked feed network.
Figure 14:
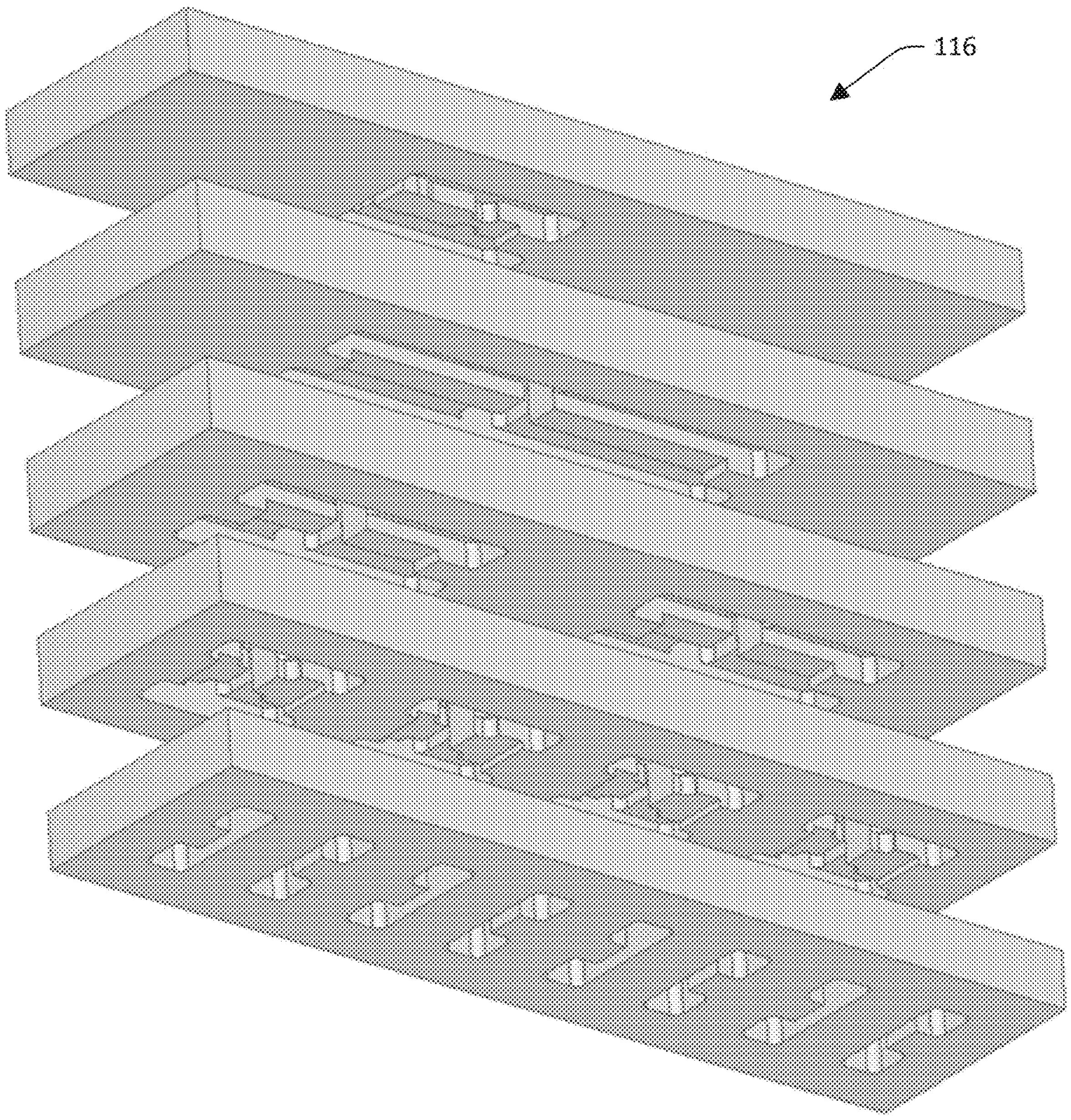

FIG. 9 depicts another implementation of the feed network 116 in a stacked arrangement. FIG. 10 shows a wireframe view of the feed network 116 illustrated in FIG. 10, where the feed network 116 is a stacked multi-piece waveguide splitter network. Hidden lines represent edges of hidden surfaces. FIG. 11 shows top-down views of each of the five constitutive pieces of the stacked multi-piece splitter feed network 116 illustrated in FIG. 10. FIG. 12 shows bottom-up views of each of the five constitutive pieces of the stacked multi-piece splitter feed network 116 illustrated in FIG. 10. The constitutive pieces can be manufactured using machining processes that enable standard end mills to be used with machining operations happening from two sides of each piece. FIG. 13 shows an exploded top-down isometric view of the stacked multi-piece splitter feed network 116 illustrated in FIG. 10, and FIG. 14 shows an exploded bottom-up isometric view of the stacked multi-piece splitter feed network 116 illustrated in FIG. 10.

A few different methods of assembly are possible using this splitter feed network topology. The different pieces need to be aligned. This can be done with holes machined in each piece and pins that fit in the holes. This can also be done by precision machining the outer walls of the pieces and using flats to align the pieces. The pieces can have compression between the different layers, which can be accomplished by clamping the pieces together (such as with bolts and nuts). Further, this can be done using an adhesive such as a conductive epoxy or solder. Such an epoxy can be applied as a preform, using a stamping process, using a stencil, or otherwise.

Although the images and the text describe fabricating these pieces using standard machining with end mills, other alternatives exist. The through holes can be cut using waterjet. Both the through holes and routing of channels in the parts can be fabricated using electrical discharge machining (EDM), including plunge EDM for the channels that do not go through the part. With a process that can create parts with smaller corner radii than a common end mill, this can simplify the design process and be useful for higher frequency designs (such as for millimeter-wave frequencies).

Figure 15B:
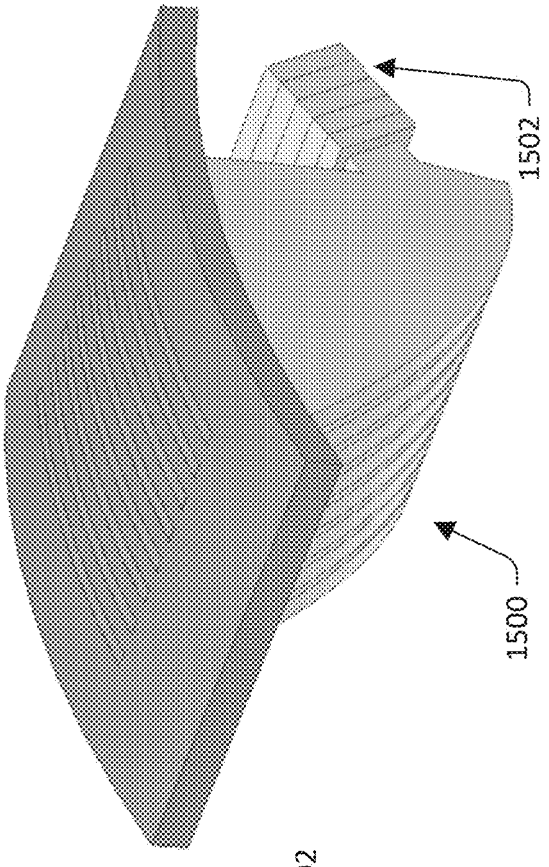
FIGS. 15A-15C are various views of an exemplary feed network and an exemplary antenna array.
Figure 15A:
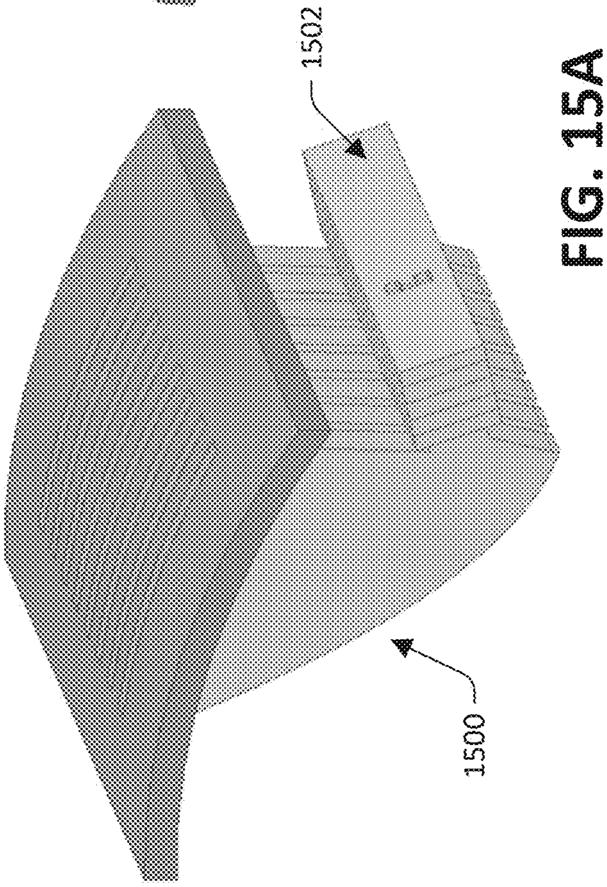
Figure 15C:
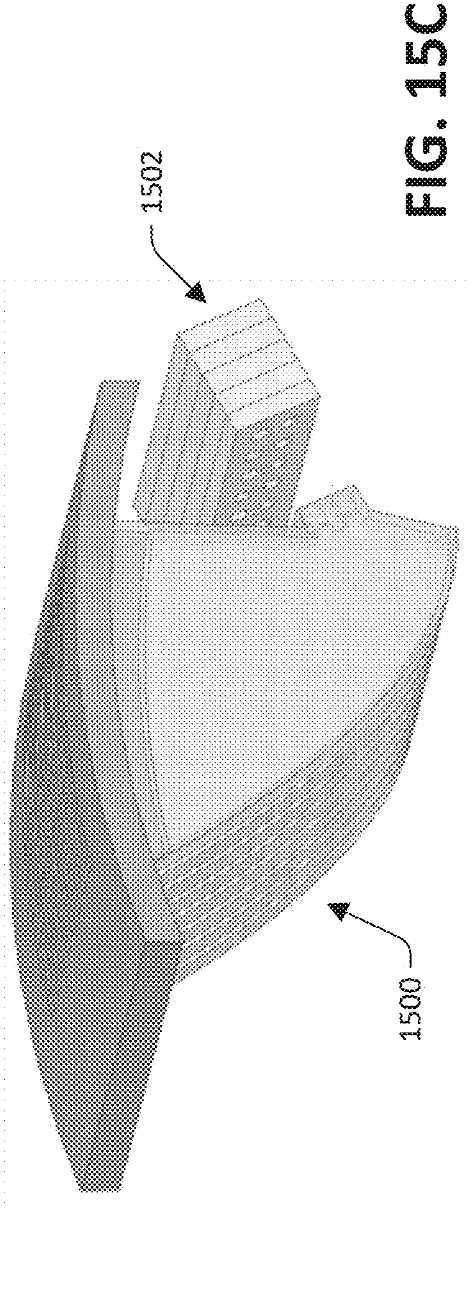

FIGS. 15A-15C illustrate various views of an exemplary feed network 1502 and an exemplary antenna array 1500 and illustrate how the feed and antenna elements can be combined.

Figure 16:
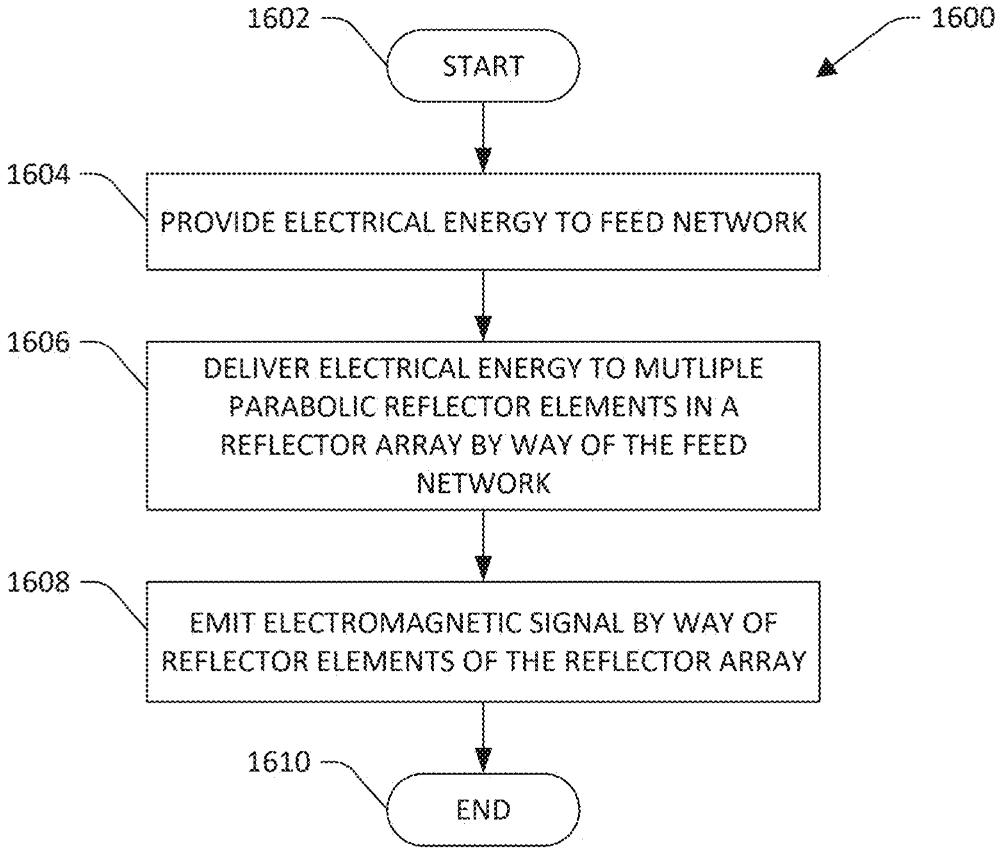
FIG. 16 illustrates a methodology for emitting an electromagnetic signal from an antenna apparatus.
Figure 17:
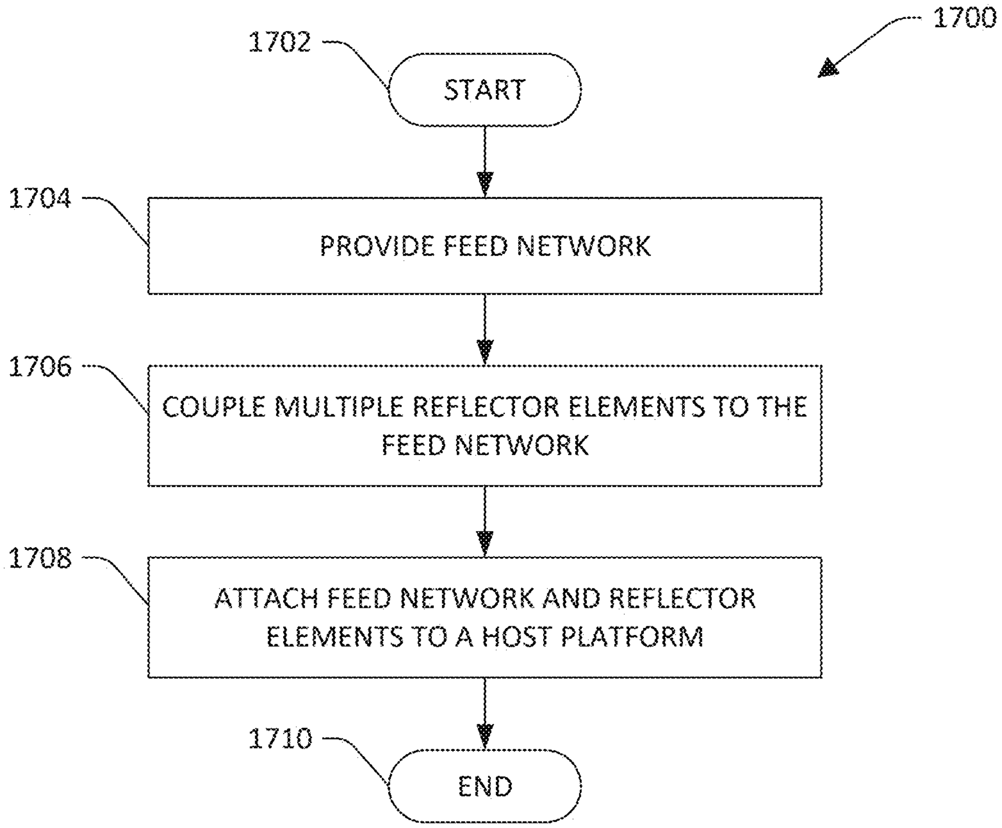
FIG. 17 illustrates a methodology for constructing an antenna apparatus.

FIGS. 16 and 17 illustrate methodologies relating to an antenna array structure. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring solely to FIG. 16, a methodology 1600 for emitting an electromagnetic signal from an antenna structure is illustrated. The methodology 1600 starts at 1602, and at 1604, electromagnetic energy is provided to a feed network, such as the feed network 116. At 1606, the electromagnetic energy is delivered to multiple parabolic reflector elements in a reflector array by way of the feed network. The reflector array can be the reflector array 400 depicted in FIGS. 4 and 5. At 1608, an electromagnetic signal is emitted by way of the reflector elements of the reflector array. The methodology 1600 completes at 1610.

Now turning to FIG. 17, a methodology 1700 for constructing an antenna apparatus is illustrated. The methodology 1700 starts at 1702, and at 1704, a feed network (e.g., the feed network 116) is provided. At 1706, an array of parabolic reflector elements (e.g., the array 400) is coupled to the feed network to form the antenna apparatus. At 1708, the antenna apparatus is optionally attached to its host platform, which can function as the antenna ground plane. The methodology 1700 completes at 1710. Note that for the design of such antenna apparatuses, it is often desired to include the host platform in the analysis of the antenna array to understand expected performance.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An antenna apparatus comprising:

a reflector element that comprises a nonresonant waveguide cavity, the reflector element including:

a support surface including an offset reflector feed configured to receive and transmit an electromagnetic signal;

a parabolic reflector surface opposite the support surface, the parabolic reflector surface adapted to reflect the electromagnetic signal;

an aperture adapted to receive and transmit the electromagnetic signal, where the support surface, the parabolic reflector, and the aperture define an outer perimeter of the nonresonant waveguide cavity;

a top metallic planar surface;

a bottom metallic planar surface parallel to the top metallic planar surface, the top and bottom metallic planar surfaces being orthogonal to the parabolic reflector, the aperture, and the support surface, the top and bottom metallic planar surfaces defining opposing planar surfaces of the nonresonant waveguide cavity; and a dielectric window, the dielectric window adjacent the aperture and at least partially filling the nonresonant waveguide cavity.

2. The antenna apparatus of claim 1, further comprising a capacitive diaphragm, the capacitive diaphragm located adjacent the dielectric window, the capacitive diaphragm adapted to transform an impedance of the aperture.

3. The antenna apparatus of claim 1, further comprising a conductive ground plane that is coupled to the reflector element.

4. The antenna apparatus of claim 1, wherein the nonresonant waveguide cavity is at least partially filled with one of air, vacuum, or a low dielectric constant material.

5. The antenna apparatus of claim 1, wherein:

the offset reflector feed is configured to receive the electromagnetic signal and transmit the thus received electromagnetic signal to the parabolic reflector, the parabolic reflector is adapted to reflect and collimate the thus transmitted electromagnetic signal from the offset reflector feed to the aperture, and the aperture is adapted to receive the thus reflected electromagnetic signal from the parabolic reflector and to transmit the thus reflected electromagnetic signal; or the aperture is adapted to receive the electromagnetic signal and transmit the thus received electromagnetic signal to the parabolic reflector, the parabolic reflector is adapted to reflect the thus transmitted electromagnetic signal from the aperture to the offset reflector feed, and the offset reflector feed is configured to receive the thus reflected electromagnetic signal from the parabolic reflector and to transmit the thus reflected electromagnetic signal.

6. The antenna apparatus of claim 1, further comprising at least one additional reflector elements, each of the at least one additional reflector elements comprising a corresponding nonresonant waveguide cavity, each of the at least one additional reflector elements including:

a corresponding support surface including a corresponding offset reflector feed configured to receive and transmit a corresponding electromagnetic signal;

a corresponding parabolic reflector surface opposite a corresponding support surface, the corresponding parabolic reflector surface adapted to reflect a corresponding electromagnetic signal;

a corresponding aperture adapted to receive and transmit a corresponding electromagnetic signal, the corresponding support surface, the corresponding parabolic reflector, and the corresponding aperture defining a corresponding outer perimeter of a corresponding nonresonant waveguide cavity;

a corresponding top metallic planar surface; and a corresponding bottom metallic planar surface parallel to a corresponding top metallic planar surface, the corresponding top and bottom metallic planar surfaces being orthogonal to a corresponding parabolic reflector, a corresponding aperture, and a corresponding support surface, the corresponding top and bottom metallic planar surfaces defining opposing planar surfaces of a corresponding nonresonant waveguide cavity;

wherein the reflector element and each of the at least one additional reflector elements are adjacent to one another in the antenna apparatus and are in parallel with one another along either a common axis or about the common axis.

7. The antenna apparatus of claim 6, wherein the reflector element and each of the at least one additional reflector elements are identical to one another.

8. The antenna apparatus of claim 7, further comprising a feed network, the feed network including at least one "Y" splitter coupled to the offset reflector feed and a corresponding offset reflector feed of one of the at least one additional reflector elements, the "Y" splitter including a ridge waveguide.

9. The antenna apparatus of claim 8, wherein the feed network further includes one or more of a "Y" splitter, a "T" splitter, or a connecting waveguide segment, each of the one or more of the "Y" splitter, the "T" splitter, or the connecting waveguide segment including a corresponding ridge waveguide.

10. The antenna apparatus of claim 8, A wherein the feed network is a stacked multi-piece waveguide splitter network.

11. The antenna apparatus of claim 8, further comprising an inductive iris, the inductive iris located adjacent the offset reflector feed, the inductive iris adapted to impedance match the ridge waveguide to the nonresonant waveguide cavity or to the feed network.

12. A method comprising:

providing an antenna apparatus, wherein the antenna apparatus comprises a reflector element, and further wherein the reflector element comprises:

a support surface including an offset reflector feed configured to receive and transmit an electromagnetic signal;

a parabolic reflector surface opposite the support surface, the parabolic reflector surface adapted to reflect the electromagnetic signal;

an aperture adapted to receive and transmit the electromagnetic signal, where the support surface, the parabolic reflector, and the aperture define an outer perimeter of the nonresonant waveguide cavity;

a top metallic planar surface; and a bottom metallic planar surface parallel to the top metallic planar surface, the top and bottom metallic planar surfaces being orthogonal to the parabolic reflector, the aperture, and the support surface, the top and bottom metallic planar surfaces defining opposing planar surfaces of the nonresonant waveguide cavity, where the reflector element comprises a dielectric window, the dielectric window adjacent the aperture and at least partially filling the nonresonant waveguide cavity; and at least one of:

receiving the electromagnetic signal by way of the aperture; or transmitting the electromagnetic signal by way of the aperture.

13. The method of claim 12, wherein the antenna apparatus is included in a radar system, and further wherein the electromagnetic signal is a radar signal.

14. The method of claim 12, wherein the reflector element comprises a plurality of reflector elements that each include a respective support surface including a respective offset reflector feed, a respective parabolic reflector surface, a respective aperture, a respective top metallic planar surface, and a respective bottom metallic planar surface;

wherein a number of the reflector elements in the plurality of reflector elements is a multiple of two; and wherein the plurality of reflector elements are arranged in parallel with one another along either a common axis or about the common axis.

15. The method of claim 14, the antenna apparatus further comprising a feed network, the feed network including at least one "Y" splitter coupled to an adjacent pair of offset reflector feeds of an adjacent pair of reflector elements of the plurality of reflector elements, the "Y" splitter including a ridge waveguide.

16. The method of claim 15, wherein the feed network further includes one or more of a "Y" splitter, a "T" splitter, or a connecting waveguide segment, each of the one or more of the "Y" splitter, the "T" splitter, or the connecting waveguide segment including a corresponding ridge waveguide.

17. The method of claim 12, wherein the nonresonant waveguide cavity is at least partially filled with one of air, vacuum, or a low dielectric constant material.

18. A method for forming an antenna apparatus, the method comprising:

positioning a first reflector element adjacent to a second reflector element, wherein each of the first reflector element and the second reflector element includes:

a support surface including an offset reflector feed configured to receive and transmit an electromagnetic signal;

a parabolic reflector surface opposite the support surface, the parabolic reflector surface adapted to reflect the electromagnetic signal;

an aperture adapted to receive and transmit the electromagnetic signal, where the support surface, the parabolic reflector, and the aperture define an outer perimeter of a nonresonant waveguide cavity;

a conductive ground plane that is coupled thereto;

a top metallic planar surface; and a bottom metallic planar surface parallel to the top metallic planar surface, the top and bottom metallic planar surfaces being orthogonal to the parabolic reflector, the aperture, and the support surface, the top and bottom metallic planar surfaces defining opposing planar surfaces of the nonresonant waveguide cavity; and coupling the first reflector element and the second reflective element to a feed network adapted to receive and transmit the electromagnetic signal.

* * * * *